US005798920A

United States Patent [19]
Crucius et al.

[11] Patent Number: 5,798,920
[45] Date of Patent: Aug. 25, 1998

[54] STORAGE AND RETRIEVAL MACHINE CONTROL SYSTEM HAVING AN ENCODER AND AN OPTICAL DISTANCE METER

[75] Inventors: Wesley Crucius, Brookfield; Randall M. Schneider, Pewaukee, both of Wis.

[73] Assignee: HK Systems, Inc., New Berlin, Wis.

[21] Appl. No.: 560,434

[22] Filed: Nov. 17, 1995

[51] Int. Cl.[6] .............................. G05B 19/18; B65G 1/00
[52] U.S. Cl. ...................... 364/167.01; 414/273; 414/275; 414/279; 414/280; 414/281
[58] Field of Search ....................... 364/167.01, 436, 364/423.098, 424.027, 424.028; 414/273, 275, 279, 281, 280; 356/375; 340/989, 990, 991, 992

[56] References Cited

U.S. PATENT DOCUMENTS

| | | | |
|---|---|---|---|
| 4,415,975 | 11/1983 | Burt | 414/273 |
| 4,428,708 | 1/1984 | Burt | 414/275 |
| 4,773,807 | 9/1988 | Kroll et al. | 414/282 |
| 4,817,000 | 3/1989 | Eberhardt | 364/443 |
| 4,967,130 | 10/1990 | Sorensen et al. | 318/652 |
| 5,044,859 | 9/1991 | Sorensen et al. | 414/273 |
| 5,091,685 | 2/1992 | Sorensen et al. | 318/652 |
| 5,170,863 | 12/1992 | Devroy | 187/224 |
| 5,175,415 | 12/1992 | Guest | 235/95 R |
| 5,187,664 | 2/1993 | Yardley et al. | 364/424.02 |
| 5,281,901 | 1/1994 | Yardley et al. | 318/587 |
| 5,341,130 | 8/1994 | Yardley et al. | 340/825.06 |
| 5,397,211 | 3/1995 | Lloyd et al. | 414/663 |
| 5,530,548 | 6/1996 | Campbell et al. | 356/375 |

Primary Examiner—Emanuel Todd Voeltz
Assistant Examiner—Demetra R. Smith
Attorney, Agent, or Firm—Nilles & Nilles, S.C.

[57] ABSTRACT

A storage and retrieval machine comprises a base, a carriage, and a control system. The control system is used to control the movement of the carriage in the vertical direction and/or the movement of the base in the horizontal direction. The control system includes at least one encoder and at least one optical distance meter. The encoder provides relative position information during a middle portion of the SRM trajectory, i.e., during the implementation of a feedback control scheme. The optical distance meter provides absolute position information to the control system at an endpoint of the SRM trajectory, i.e., to verify that the SRM has in fact reached its destination. If the control system controls both the movement of the carriage and the movement of the base, then two encoders and two optical distance meters are used.

20 Claims, 7 Drawing Sheets

STORAGE AND RETRIEVAL MACHINE CONTROL SYSTEM HAVING AN ENCODER AND AN OPTICAL DISTANCE METER

FIELD OF THE INVENTION

The present invention relates generally to control systems, and in particular to a control system for storage and retrieval machines.

DESCRIPTION OF RELATED ART

Storage and retrieval machines (SRMs) are well known, inter alia, for retrieving load objects from warehouse racks and transporting them to distant destinations. SRMs typically travel on a rail along an aisle between adjacent storage rack structures. Further, SRMs have a base on which is mounted a mast supporting a lift carriage. Hence, the SRM base moves horizontally along the rail, and the lift carriage moves vertically along the SRM mast. It is therefore apparent that a control system is required to control the horizontal movement of the SRM base along the rail, and to control the vertical movement of the lift carriage along the SRM mast.

In order to implement such a control system, it is necessary to monitor the movement (i.e., position, velocity, and/or acceleration) of the SRM base and lift carriage. Until now, SRM control systems have used either encoders or optical distance meters, but not both. Individually, however, each of these devices suffers drawbacks.

A first drawback of encoders is that they are unable to measure absolute position. Encoders generally comprise a disc mounted on a rotating axis. The rotating axis is in turn mounted to, for example, a wheel or rotating drum. In operation, the encoder emits a pulse every time the axis rotates a small predetermined amount. Hence, the rotation of the axis can be monitored by counting the pulses emitted by the encoder. By monitoring the rotation of the rotating axis, the encoder can be used to monitor the amount of lateral distance traveled by the wheel or to monitor an amount of cable let out by the drum.

It should therefore be apparent that an encoder is only capable of measuring relative position distance and can not measure absolute position. In conjunction with the horizontal axis, the term "absolute position" refers to the SRM's location on the rail with respect to a known reference point (as opposed to "relative position," or distance traveled). For example, when an SRM is first powered-up, the SRM control system has no way of knowing where along the rail it is located. The encoder outputs can only be used to determine that the SRM has not moved since power-up. Hence, some other method for determining absolute position is required, such as the use of a home sensor. According to this method, the SRM travels down the rail upon each power-up until it finds a home sensor, the location of which is thereafter used as a reference point. However, this approach has the drawback that it is time consuming to execute. Hence, a better method of measuring absolute position is needed.

A second drawback of encoders is that, in some operating situations, they can not truly even keep track of relative position. In regards to horizontal movement, there are several reasons why an encoder can not always maintain an accurate measure of distance traveled. In general, these reasons involve situations where rotation of the SRM wheels does not accurately correlate with distance traveled. In particular, the wheels of the SRM may slip on the rail when a large torque is applied to the wheels. Additionally, the wheels of the SRM may not be properly aligned, causing the front and rear wheels to rotate at slightly different rates. Finally, minor imperfections in the rail surface can also affect the rotation of the wheels.

In regards to vertical movement, it may be recalled that the encoder measures the rotation of the hoist motor as the hoist motor rotates a cable drum assembly. Depending on the direction of rotation of the cable drum assembly, the cable is unwound or wound upon the cable drum assembly, causing the lift carriage to ascend or descend along the SRM mast.

Again, however, the rotation of the cable drum assembly does not accurately correlate with the vertical distance traveled by the carriage. Therefore the encoder does not maintain an accurate measure of vertical distance traveled. The source of the problem is that, in practice, cables are not completely unstretchable but rather behave like stretchable springs. This problem is very difficult to resolve because a wide variety of factors influence the relationship between the amount of cable wound (or unwound) and the amount of vertical movement of the lift carriage.

It may be recalled that the equation governing springs is as follows:

$$F = -k \times \Delta X$$

where

F is force, k is the spring constant, and $\Delta X$ is change in the length in the spring.

In terms of this equation, the problem is very difficult to resolve because it is very difficult to determine the force F and the spring constant k. Without knowing these values, it is impossible to calculate the change in spring length $\Delta X$. (Note that in the present context, $\Delta X$ refers to the difference in cable length due to the application of a downward force to the cable, and not to the amount by which the cable is wound or unwound to retrieve or deposit a load object.)

The force F is difficult to determine because it is constantly varying. The force F includes the weight of the lift carriage and the weight of the load. However, the weight of each and every possible load that the SRM might retrieve is generally not known. Further, this weight may change in the middle of the lifting operation (e.g., there is a sudden change when the carriage initially "lifts up" its load). Additionally, acceleration or deceleration of the carriage as it is raised and lowered implies that the force F applied to the spring is changing.

Finally, the force F is difficult to determine because it is not enough to simply take into account the weight of the load; it is also necessary to take into account the "pre-stretching" of the cable that occurs when the cable is wound on the cable drum assembly. The problem arises as follows: As cable is wound on the cable drum assembly, it is generally under tension, i.e., because the weight of the carriage is always applied to the cable. However, different lengths of wound cable are under different amounts of tension, because they supported loads of different additional amounts of weight when wound. Once wound, the cable tends to remain at the same tension at which it was wound due to rope to drum friction. Therefore, when released, the different lengths of cable are still under different amounts of tension (i.e., are already "pre-stretched" by different amounts). The released cable then stretches or contracts by differing amounts depending on the amount of tension it was under when wound. Hence, when computing how much the cable will stretch due to a given load, it is not enough to simply take into account the weight of the load. It is also necessary to determine the amount by which the cable was already stretched when released. For example, if a given length of cable was under 100 lbs. of tension when wound, and supports 100 lbs. when released, then it will not stretch at all when released.

This also makes it more difficult to calculate the spring constant. The spring constant of a spring is a function of the length of the spring, which refers to the amount of cable that has been released. Hence, if the amount of cable that has been released is unknown, it is impossible to calculate the spring constant.

In short, the drawbacks of encoders are (1) that they are unable to measure absolute position, and (2) that in some situations, they can not truly even measure relative position.

As previously mentioned, another device capable of monitoring the movement of the SRM base and lift carriage is the optical distance meter. Optical distance meters typically comprise a laser and a reflective surface. The laser beam is reflected off the reflective surface and back to a sensor located adjacent the laser. The distance measurement is made based on the travel time of the laser beam.

Like encoders, however, optical distance meters also suffer drawbacks. Specifically, optical distance meters are unable to update position information rapidly enough to permit smooth travel of the SRM. In particular, present technology optical distance meters can update position information only ten times per second. Given that SRMs can travel at speeds up to 900 ft/s, this means that the SRM can travel as much as eighteen inches before receiving updated position information. In practice, this causes the movement of the SRM to be very rough. In contrast, it may be noted, encoders can update position information at a rate of two to five hundred times per second, causing the movement of the SRM to be relatively smooth.

SUMMARY OF THE INVENTION

A storage and retrieval machine comprising both an optical distance meter and an encoder is presented. Specifically, a storage and retrieval machine according to the present invention comprises a base, a carriage, and a control system. The control system is used to control the movement of the carriage in the vertical direction and/or the movement of the base in the horizontal direction. The control system includes at least one encoder and at least one optical distance meter. The encoder provides relative position information during a middle portion of the SRM trajectory, i.e., during the implementation of a feedback control scheme. The optical distance meter provides absolute position information to the control system at an endpoint of the SRM trajectory, i.e., to verify that the SRM has in fact reached its destination. If the control system controls both the movement of the carriage and the movement of the base, then two encoders and two optical distance meters are used.

A method of controlling movement of a warehouse vehicle from a start point to an end point comprises the steps of ascertaining the location of the start point; generating information pertaining to the movement of the warehouse vehicle using an encoder; implementing a feedback control system; and ascertaining that the moveable object has reached the end point. The feedback control system controls the movement of the warehouse vehicle from the start point to the end point and is implemented based on the movement information generated by the encoder. The ascertaining step further comprises the steps of emitting a laser beam from a laser, and measuring a laser beam travel time, the laser beam travel time being the amount of time required for the laser beam to travel from the laser to a laser beam sensor.

Also disclosed is a method of calibrating an optical distance meter with an encoder. The optical distance meter and the encoder are adapted for monitoring movement of a storage and retrieval machine. The method comprises the steps of advancing the storage and retrieval machine along a trajectory; generating first and second distances measurement; and storing information pertaining to the second distance measurement in a look-up table as a function of the first distance measurement. The first distance measurement is generated by the encoder, whereas the second distance measurement is generated by the optical distance meter. The first and second distance measurements represent substantially the same location of the storage and retrieval machine. Hence, if it is assumed that the encoder output represents an accurate measure of the position of the storage and retrieval machine, then the information stored in the look-up table can be used to compensate for inherent errors of the optical distance meter.

The advantages of the present invention are as follows. First, the use of an optical distance meter permits the present invention to measure absolute distance directly. Regardless of how much slippage there is in the encoder system, the present invention is still able to position the storage and retrieval machine with a high degree of accuracy. The optical distance meter is used at the end point of SRM movement to ascertain whether the SRM has in fact reached its destination.

Second, during SRM travel, the redundant use of both an encoder and an optical distance meter permits verification of the encoder measurements. Hence, if a large amount of slippage occurs, the control system can recognize this fact and compensate even prior to reaching the endpoint of SRM movement.

Third, the use of an encoder during SRM travel permits the present invention to update movement information rapidly. Because the movement information is updated rapidly, the travel of the SRM is relatively smooth.

Fourth, the creation and use of a look-up table permits the accuracy of the optical distance meter to be enhanced. The look-up table is created under conditions which enhance the accuracy of the encoder. The look-up table may then be used to enhance the accuracy of the optical distance meter when the encoder is operating under conditions which degrade its accuracy. The look-up table therefore permits the present invention to operate with an especially high degree of accuracy.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

I. Overview of SRM System

Figure 1:
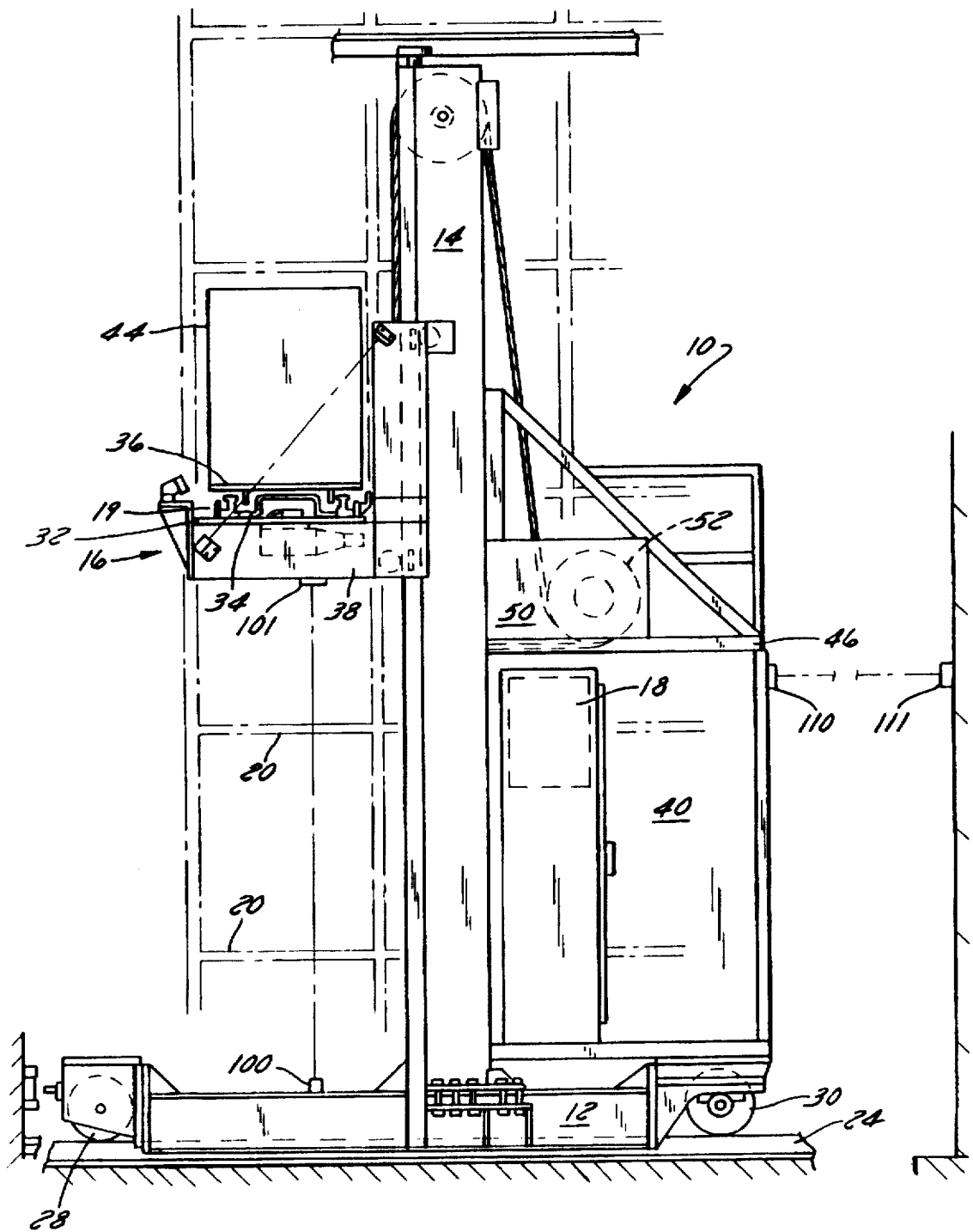
FIG. 1 illustrates a side elevation view of a storage and retrieval machine utilizing the present invention.
Figure 2:
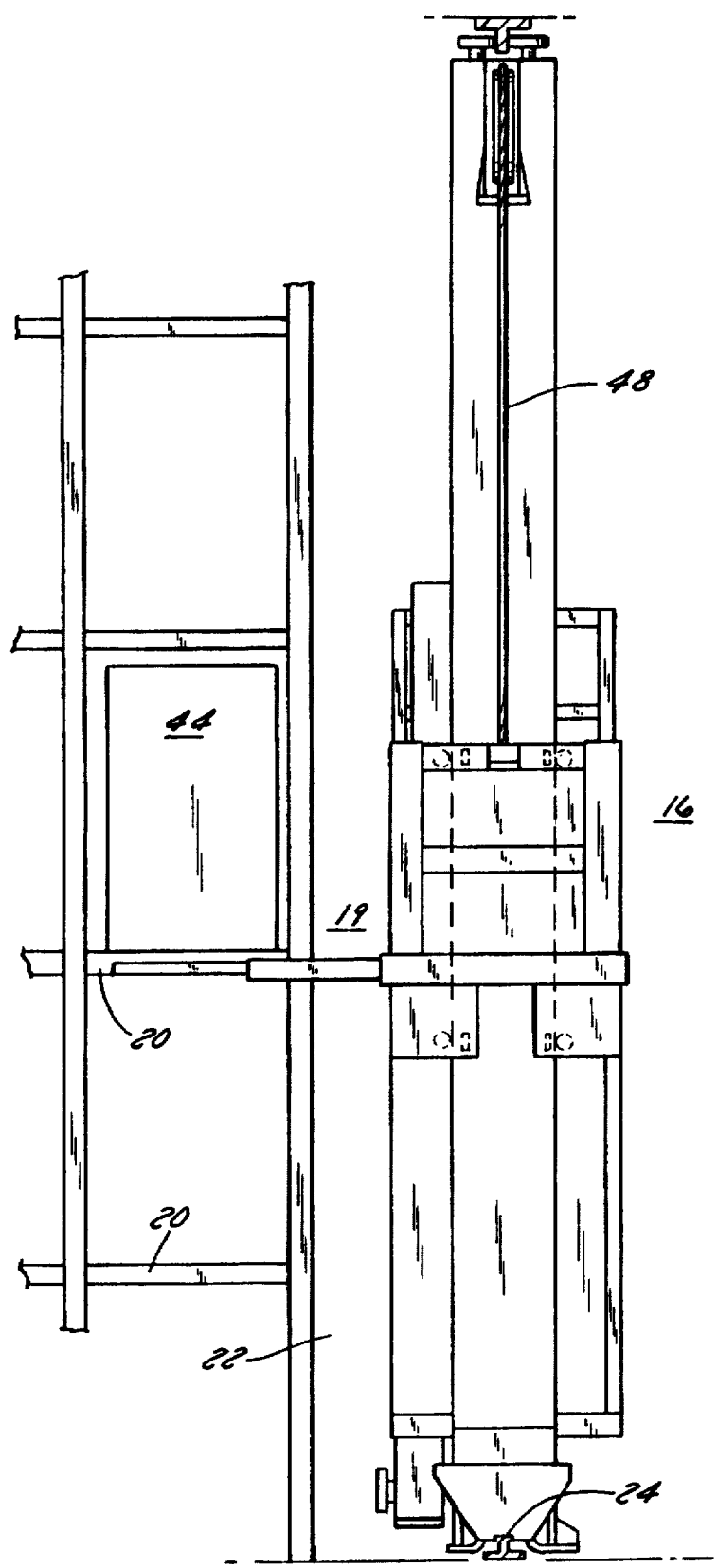
FIG. 2 illustrates a front elevation view of a storage and retrieval machine utilizing the present invention.

Referring to FIGS. 1-2 of the drawings, a storage and retrieval machine (SRM) 10 according to the present invention is illustrated. The SRM 10 comprises a base 12, a mast 14, a carriage 16 movable on a vertical path along the length of mast 14 to selected vertical positions, a shuttle 19 mounted on the carriage 16, and a computer 18 which implements a control system 60 (illustrated in FIG. 3). A front wheel 28 and a rear wheel 30 are mounted on the base 12 and roll along a rail 24 running through an aisle path 22 in a storage area such as a warehouse having stacked storage racks 20. A base motor 40 is mounted on the base 12 and drives the rear wheel 30. This causes the base 12 and thereby the SRM 10 to travel along the rail 24 to selected locations in the aisle path 22 adjacent to the stacked storage racks 20. At each aisle location, the carriage 16 is driven in vertical directions to a selected one of the storage racks 20 where the shuttle 19 is driven horizontally into a storage rack to deliver or retrieve a load object such as box 44. The carriage 16 is driven by a hoist motor 50 acting through a cable drum assembly 52, both mounted on the frame 46 affixed to the base 12 and the mast 14. The cable drum assembly 52 in turn acts on a cable 48 connected to the carriage 16. A suitable A.C. source (not shown) is provided for supplying electrical power to the SRM 10 for the motor drives 40 and 50 and for the control system 60.

The shuttle 19 comprises a lower base plate 32, an intermediate plate 34, and a top plate 36. A shuttle motor drive 38 causes the plates 34 and 36 to extend in a telescoping fashion to the position shown in FIG. 2 and retract to a centered position. The shuttle 19 thus acts in conjunction with the base 12 and the carriage 16 to deposit a load object 44 in (or retrieve from) a storage rack 20.

The general structural/mechanical features of an SRM system are discussed in greater detail in U.S. Pat. Nos. 4,773,807; 5,044,859; 5,091,685 and 5,397,211; which are hereby incorporated by reference.

II. Structure and Operation of the SRM Control System

Figure 3:
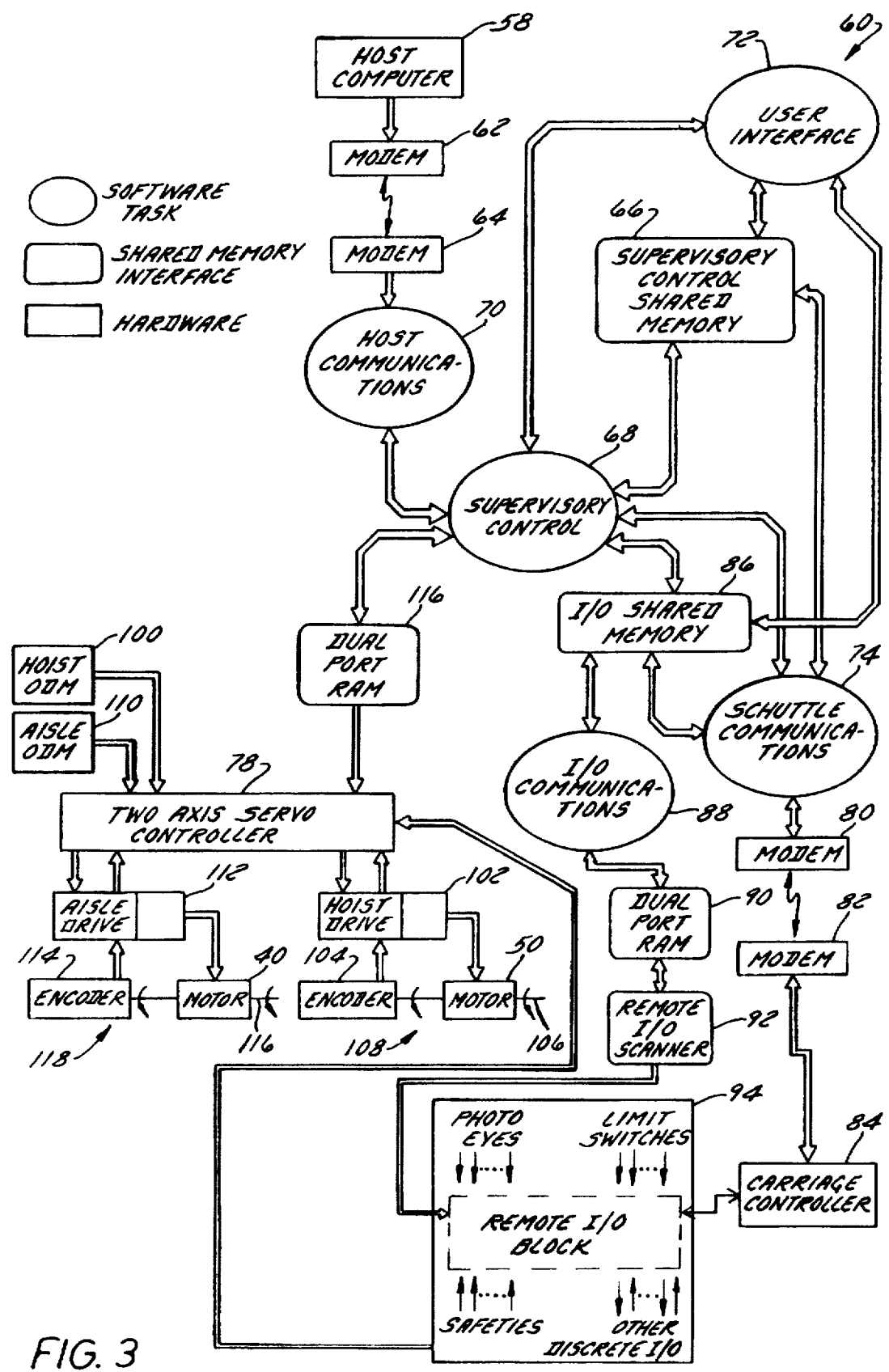
FIG. 3 illustrates an example of a control system according to the present invention.

Particular attention is now given to the control system 60 of an SRM 10 according to the present invention, illustrated especially in FIG. 3. Generally speaking, two basic types of operations are performed in the control system 60. First, the control system 60 communicates with external devices which provide instructions and information to the control system 60. In particular, the control system 60 communicates with a host computer 58, with a user of the SRM 10 via a user interface 72, and with a plurality of discrete inputs and outputs via a remote I/O block 94. Second, based on the communications discussed above, the control system 60 controls a plurality of external devices. In particular, the control system 60 controls the extension and retraction of the shuttle table 19 using carriage controller 84, and the horizontal movement of the base 12 and the vertical movement of the carriage 16 using a two axis servo controller 78.

A supervisory control 68 oversees the performance of these operations and is at the center of the control system 60. The supervisory control 60 is implemented in the computer 18, which also implements the other software tasks illustrated in FIG. 3. The communication and control operations of the control system 60 will now be discussed in greater detail, with special attention being given to the vertical and horizontal control systems.

The control system 60 communicates with the host computer 58 via a communication path including modems 62 and 64. Generally speaking, the host computer 58 maintains overall control of the warehouse, i.e., by issuing commands to several SRMs and by tracking inventory. The commands issued by the host computer 58 relate to instructions for picking up loads: where to pickup the loads, where to deliver the loads, and so on. The integrity of the message from the host computer 58 is verified by a host communications software module 70. The host communications module 70 then communicates the message to supervisory control 68, which decides in a general fashion how to direct and act upon various portions of the message.

The control system 60 also communicates with the user interface 72. Typically, the user interface 72 will be located on the SRM 10 and will comprise a keyboard and monitor (not illustrated). The user interface 72 may be used by an on-board user of the SRM 10 to enter instructions into the control system 60 directly without going through the host computer 58. The keyboard and monitor are preferably part of the same IBM compatible computer 18 used to run the control system software. Messages may travel between the supervisory control 68 and the user interface software module 72 either via an interprocess communications link or via direct memory access of supervisory control shared memory 66 (i.e., depending on the type and destination of message transmitted).

Finally, the control system 60 communicates with a plurality of discrete I/O, designated generally by the remote I/O block 94. These inputs/outputs are binary in nature and represent signals from photo eyes, limit switches, safeties, and so on. For example, there are four axis end limit switches. These switches indicate that the SRM has reached the limit of one of its axes of movement. Hence, when the SRM nears an end of the rail 24 and encounters a mechanical stop (not illustrated), a limit switch will trigger. Alternatively, when the carriage 16 is at maximum (or minimum) height, a limit switch will also trigger.

The remote I/O block 94 communicates with an I/O communications software module 88 via a remote I/O system comprising dual port RAM 90, a remote I/O scanner 92, and the remote I/O block 94. Preferably, the remote I/O scanner 92 is an Allen-Bradley KTS Remote I/O Scanner, and the remote I/O block 94 is a 1791 Remote I/O Block, both which are manufactured by Allen-Bradley Co. (Milwaukee, WI). The I/O communications software module 88 in turn communicates with the supervisory control 68 via I/O shared memory 86.

As previously mentioned, based on these communications, the control system 60 controls a plurality of external devices. First, the control system 60 controls the extension and retraction of the telescoping shuttle plates 32, 34 and 36, i.e., by issuing instructions to the carriage controller 84. To implement this control, messages travel between the supervisory control 68 and a shuttle communications software module 74 either via an interprocess communications link or via direct memory access of I/O shared memory 86 (i.e., again depending on the type of message transmitted). The shuttle communications module 74 then handles transmitting messages to the carriage controller 84 via modems 80 and 82. The distance measurements relevant to the carriage controller 84 (i.e., the shuttle 19 extend distances) are relatively easy to make in comparison to the distance measurements relevant to the vertical and horizontal control systems. Hence, the discussion will now focus on the vertical and horizontal control systems.

The control system 60 controls the horizontal movement of the SRM 10 down the aisle 22, and the vertical movement of the carriage 16 along the mast 14. To achieve this control, the control system 60 comprises the computer 18, a two axis servo controller 78, dual port RAM 116, drives 102 and 112, motors 40 and 50, encoders 104 and 114, and optical distance meters 100 and 110. These components constitute both a vertical control system 108 and a horizontal control system 118 for the SRM 10.

The structure of the vertical control system 108 is as follows. The two axis servo controller 78 is coupled to the hoist drive 102 which in turn is coupled to the motor 50. This permits the two axis servo controller 78 to provide a drive signal to the motor 50. The rotation of the motor 50 acts through the cable drum assembly 52 to raise or lower the carriage 16 (i.e., depending on whether cable is taken in or released).

Coupled to the motor 50 on the opposite side of the output shaft 106 is the encoder 104. The encoder 104 monitors the rotation of the output shaft 106, and provides feedback to the hoist drive 102 and to the two axis servo controller 78 via the hoist drive 102. Hence, by monitoring the rotation of the output shaft 106, the encoder 104 can provide relative position information to the control system 60. (The output of the encoder 104 is also fed back to the hoist drive 102, thereby permitting torque at zero RPM.)

Note that, since the output of the encoder 104 is just a series of pulses, the encoder 104 is simultaneously generating position, velocity, and acceleration information. For example, if the pulses are simply counted and multiplied by a constant (representing distance traveled per pulse), position information is generated. If this value is further divided by the amount of time required to emit the pulses, then velocity information is generated. Hence, when it is recited herein that the encoders 104 and 114 are generating "position" information, it should be understood that this also encompasses derived velocity and acceleration information as well.

The two axis servo controller 78 also receives information about vertical carriage movement from a hoist optical distance meter 100. The optical distance meter 100 is mounted on the base 12 of SRM 10 and reflects a laser beam off a reflector 101 mounted on the bottom of the carriage 16. By determining the amount of time that it takes for the light to return to the base 12 of the SRM 10, the optical distance meter 100 can determine the vertical height of the carriage 16, and thereby provide absolute position information to the control system 60.

The structure of the horizontal control system 118 is as follows. The structure of the horizontal control system is generally analogous to that of the vertical control system. Specifically, the two axis servo controller 78 is coupled to the aisle drive 112 which in turn is coupled to the motor 40. This permits the two axis servo controller 78 to provide a drive signal to the motor 40, which in turn drives an output shaft 116 and causes the wheel 30 to rotate. The rotation of the wheel 30 causes the SRM 10 to move down the aisle.

Coupled to the motor 40 on the opposite side of the output shaft 116 is the encoder 114. The encoder 114 monitors the rotation of the output shaft 116, and provides feedback to the aisle drive 112 and to the two axis servo controller 78 via the aisle drive 112. Hence, by monitoring the rotation of the output shaft 116, the encoder 114 can provide relative position information to the control system 60. (The output of the encoder 114 is also fed back to the aisle drive 112, thereby permitting torque at zero RPM.)

The two axis servo controller also receives information about aisle movement from the aisle optical distance meter 110. The optical distance meter 110 is mounted on the SRM 10 and reflects a laser beam off a reflector 111 mounted on a back wall of the warehouse. By determining the amount of time that it takes for the light to return to the SRM 10, the optical distance meter 110 can determine the distance between the SRM 10 and the back wall, and thereby provide absolute position information to the control system 60.

Figure 4A:
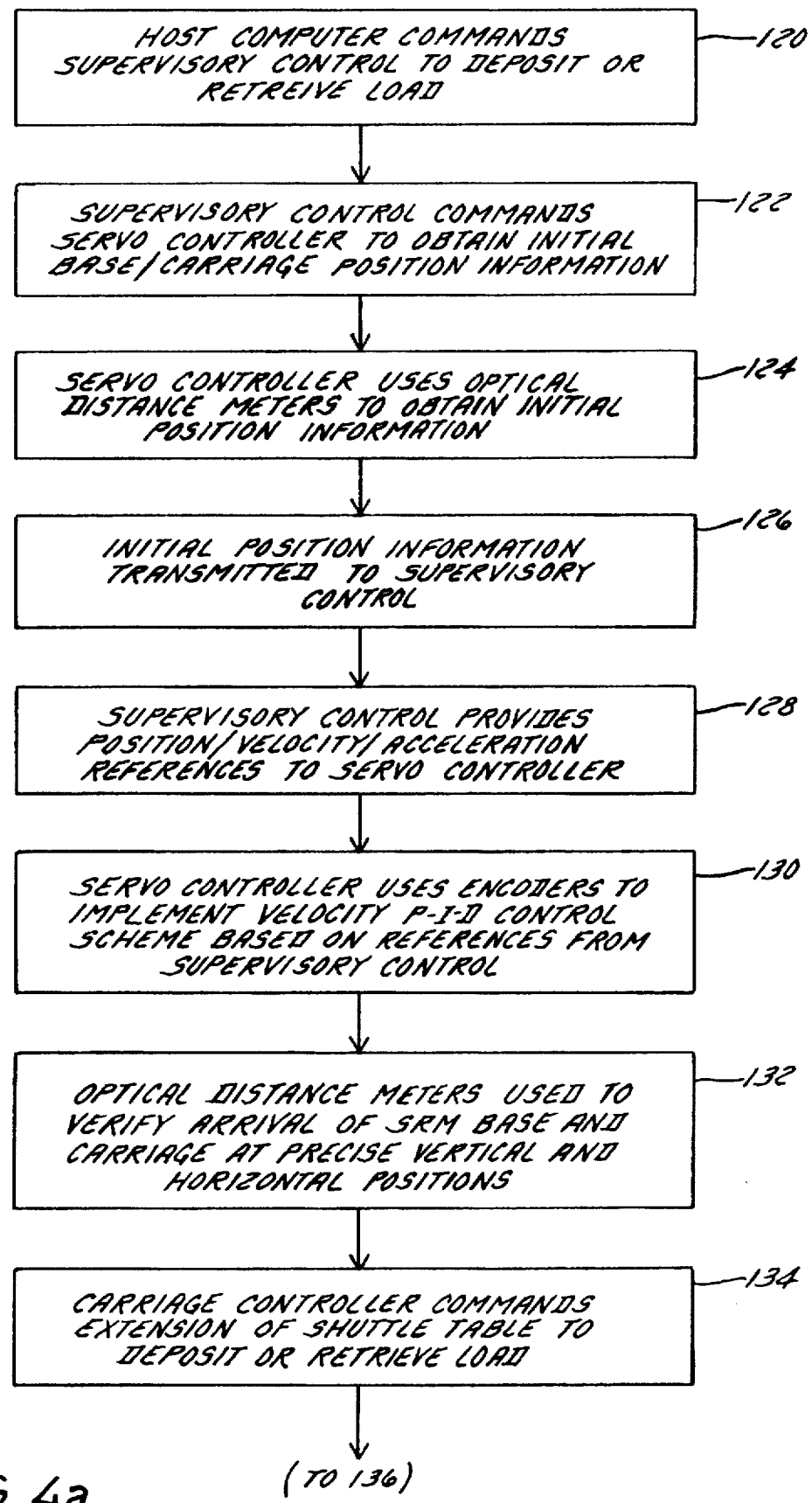
FIGS. 4A and 4B illustrate steps for delivering an SRM to a desired location according to the present invention.
Figure 4B:
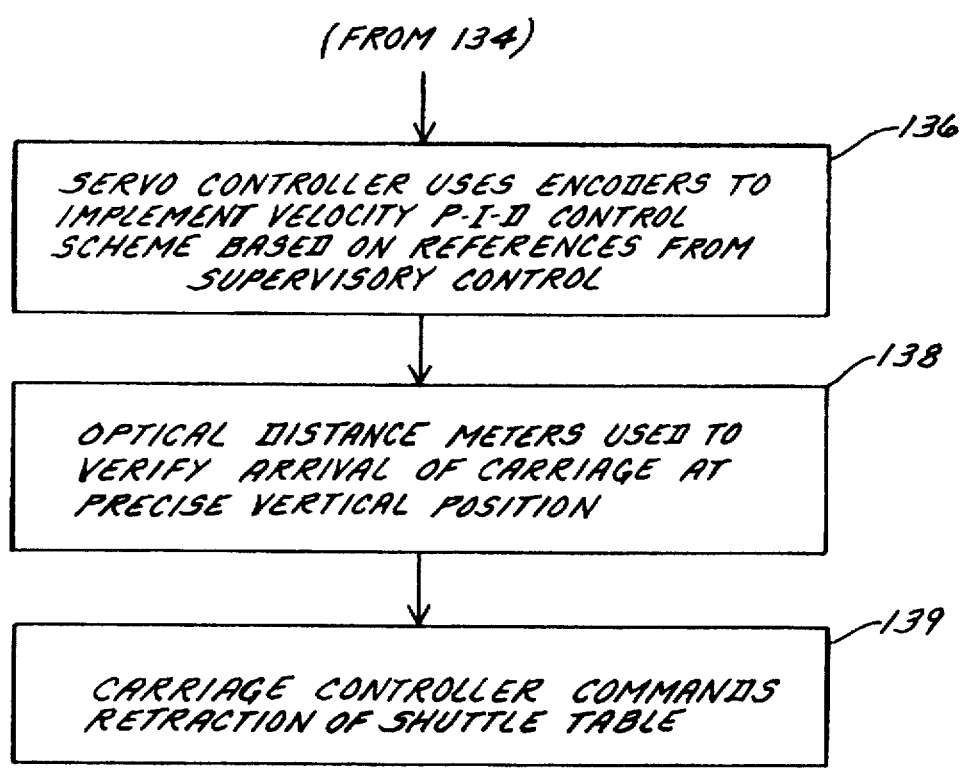

To effect the delivery or retrieval of a load, the control system 60 implements a procedure having principal steps such as those illustrated in FIG. 4. Initially, the host computer 58 ascertains the need, e.g., for a load to be retrieved from a rack 20. In response, the host computer in step 120 issues a corresponding "retrieve" command to the supervisory control 68 of the SRM 10. Typically, the command sent to the supervisory control 68 will contain logical position information concerning the rack from which the load is to be retrieved.

In step 122, the supervisory control 68 issues a command to the two axis servo controller 78 to obtain initial position information. In other words, in order to implement the control of the SRM 10, the supervisory control needs to know both the destination and the starting point of the SRM 10. Conceivably, the supervisory control 68 may already know this information to the extent that it remembers the destination of the last retrieve/drop-off point. In this case, the step 122 has already been performed and need not be performed again.

However, assuming that the supervisory control 68 does not already have initial position information, the two axis servo controller 78 instructs the optical distance meters 100 and 110 to determine the initial position of the carriage 16 and the base 12 in step 124. In particular, the optical distance meter 100 reflects a laser beam off the reflector 101 located on the bottom of the carriage 16. By determining the amount of time that it takes for the laser beam to reflect off the reflector 101, the optical distance meter 100 can determine the absolute position of the carriage 16. Similarly, the optical distance meter 110 reflects a laser beam off the reflector 111 located on the back wall of the warehouse. By determining the amount of time that it takes for the laser beam to reflect off the reflector 111, the optical distance meter 110 can determine the absolute position of the base 12.

Once the initial position information is obtained, the two axis servo controller 78 transmits this information to the supervisory control 68 in step 126. Knowing both the initial position and the destination of the base 12 and carriage 16, the supervisory control 68 makes distance, velocity, and acceleration computations to deliver the base 12 and carriage 16 to their desired locations such that the base 12 and carriage 16 arrive at their desired locations in unison. In step 128, the supervisory control provides position, velocity, and/or acceleration references to the two axis servo controller 78. Given these references, the two axis servo controller 78 implements an analog velocity proportional-integral-derivative (P-I-D) controller in step 130.

As is known, a P-I-D control system is a feedback control system. Feedback control systems maintain a prescribed relationship between a reference input and an output by comparing them and using the difference as a means of control.

For example, in the vertical control system 108, the hoist drive 102 drives the motor 50 as instructed by the servo controller 78. The encoder 104, which is coupled to the motor 50, provides a velocity feedback to the servo controller 78 via the hoist drive 102. The servo controller 78 then compares the output velocity of the shaft 106 received from the encoder 104 with a reference velocity received from the supervisory control 68. The servo controller 78 uses this comparison as a means of controlling the output velocity of the shaft 106.

Similarly, in the horizontal control system 118, the aisle drive 112 drives the motor 40 as instructed by the servo controller 78. The encoder 114, which is coupled to the motor 40, provides a velocity feedback to the servo controller 78 via the aisle drive 112. The servo controller 78 then compares the output velocity of the shaft 116 received from the encoder 114 with a reference velocity received from the supervisory control 68. The servo controller 78 uses this comparison as a means of controlling the output velocity of the shaft 116.

Hence, the outputs of the encoders 104 and 114 are used primarily during a middle portion of the carriage 16 and base 12 trajectories. Of course, the term "middle portion" includes any portion of the trajectory that is between the endpoints of the trajectory. Preferably, however, the encoders are used during those portions of the trajectory in which velocity and acceleration are changing most rapidly. It is in these portions of the trajectory that the ability to rapidly update position information can be put most advantageously to use.

The outputs of the encoders 104 and 114 are also monitored for the purpose of determining the current position of the carriage 16 and the base 12. Based on this information, the carriage 16 and base 12 will be driven toward their final destination. Ultimately, however, it is the optical distance meters 100 and 110 rather than the encoders 104 and 114 which are relied upon to ensure that the carriage 16 and the base 12 are delivered to precisely the right locations in step 132. Once at the right location, the supervisory controller 68 instructs the carriage controller 84 to extend the shuttle 19 to retrieve or deposit the load 44.

As just indicated, the optical distance meters 100 and 110 are used primarily at the endpoints of the SRM trajectory and the encoders 104 and 114 are used primarily during a middle portion of the SRM trajectory. (The term SRM trajectory is used broadly to refer to the trajectory of the base 12 and/or the trajectory of the carriage 16.) This division of labor between the two devices is highly advantageous, and permits the control system 60 to fully capitalize on the strengths of the respective devices.

Specifically, the control system 60 uses the encoders 104 and 114 during the middle portion of movement along the SRM trajectory. The encoders 104 and 114 offer the advantage that they update position information rapidly. The ability to update position information rapidly greatly improves the implementation of an analog velocity control scheme, i.e., by making it much more smooth.

Additionally, the control system 60 uses the optical distance meters 100 and 110 at the endpoints of SRM movement. The optical distance meters 100 and 110 offer the advantage that they permit the absolute position of the SRM 10 to be easily determined. For example, the control system 60 may know that it needs to be 100 feet from the back wall of the warehouse in order to be positioned properly in front of a rack. The optical distance meter 110 then reflects a laser beam off the back wall, and determines the SRM's distance from the back wall.

III. Calibration of Optical Distance Meters with Encoders

Preferably, the carriage 16 and base 12 should be delivered to within 5 mm of the correct location. Initially, this requirement is problematic because optical distance meters are typically accurate to no more than 8 mm. Nevertheless, the 5 mm tolerance is achievable because encoders, though unable to measure absolute distance, are very accurate relative to optical distance meters. (It may be noted that the procedure below minimizes the primary sources of error in encoders.)

Figure 5:
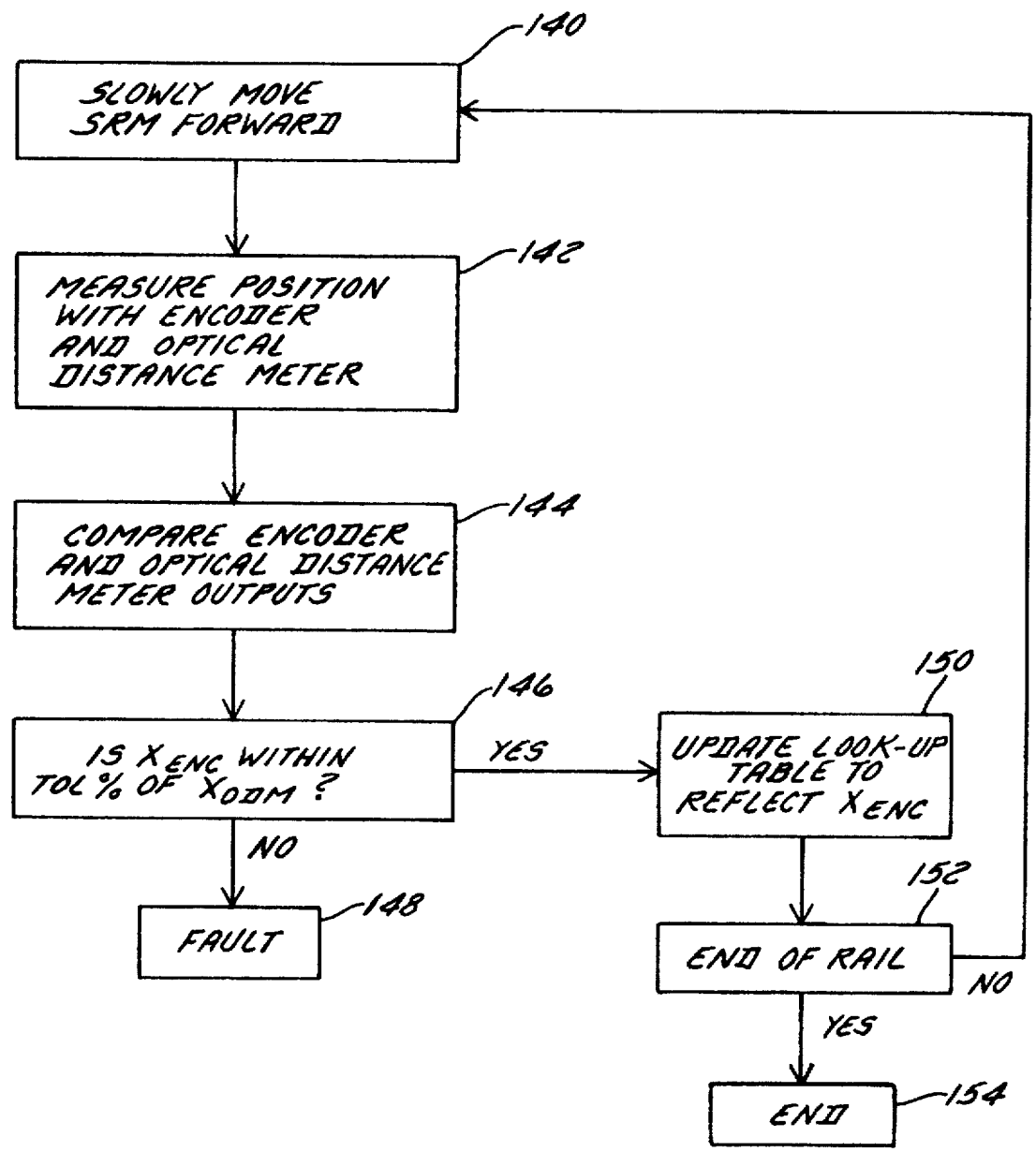
FIG. 5 is a flowchart which illustrates a process for calibrating an optical distance meter with an encoder according to the present invention.

Hence, in the preferred embodiment, a calibration procedure uses the output of the encoders to enhance the accuracy of the optical distance meters (which are able to measure absolute position). Specifically, the optical distance meters 100 and 110 are calibrated with the encoders 104 and 114, respectively. An example of this procedure is illustrated in FIG. 5, which illustrates the calibration of the aisle optical distance meter 110 with the aisle encoder 114. Of course, an analogous procedure could be used to calibrate the hoist optical distance meter 100 with the hoist encoder 104.

Essentially, the calibration involves the creation of a look-up table 162 (see FIG. 6) using a self-learning procedure. At the start of the procedure, the SRM 10 is located at an extreme end of the rail 24. In step 140, the SRM 10 is slowly moved forward. As previously noted, optical distance meters do not output data as rapidly as encoders. Hence, in order to create a sufficiently large set of data points, it is preferable to move the SRM 10 slower than usual so that the optical distance meter 110 can keep pace with the rate of change of position. Additionally, the fact that the SRM 10 is moved slowly and continuously tends to enhance the accuracy of the encoder 114. Specifically, because there are no sudden applications of torque to the wheel 30, the slippage of wheel 30 on the rail 24 is negligible. (Similarly, in the vertical system, the continuous movement of the carriage 16 minimizes the problems associated with the stretchability of the cable 48.) Consequently, there is an increased correlation of the rotation of the wheel 30 with actual distance traveled.

In step 142, the SRM's position is measured by both the optical distance meter 110 and the encoder 114. The optical distance meter outputs a distance value $X_{ODM}$; and the encoder 114 outputs a distance value $X_{ENC}$. The values $X_{ODM}$ and $X_{ENC}$ are compared in step 144. In step 146, it is ascertained whether $X_{ODM}$ and $X_{ENC}$ are within an acceptable tolerance (TOL%) of each other. If they are, then the look-up table 162 is updated in step 150 to reflect the encoder 114 measurement. If not, then there is a fault and the procedure stops at step 148.

In order to understand steps 146, 148, and 150, it is helpful to understand the types of non-random errors that are encountered when using these two types of devices. In the horizontal control system 118, for example, the encoder 114 generates non-random error to the extent that the actual wheel diameter is different than the value used by the control system 60. For example, assume that the control system 60 uses a value of 16" for the diameter of the wheel 30, when in fact diameter of the wheel 30 is only 15.99". The control system 60 then tries to calculate the distance traveled by the SRM 10 using the circumference of the wheel (i.e., by multiplying 16" by $\pi$). However, the distance calculated by the control system 60 will always be slightly greater than the distance actually traveled, since the wheel 30 is in fact only 15.99" in diameter.

It should be noted that this error becomes larger in direct proportion to the amount of distance traveled. Hence, the error is largest when the SRM 10 is at the end of the rail 24. Further, if the SRM 10 is at the end of the rail 24 and the encoder 114 is not in error, it may be safely assumed that the encoder 114 measurements were also accurate for portions of the rail 24 traveled earlier. (An analogous error component is present in the vertical control system.)

Optical distance meters also typically generate a certain amount of non-random error Err(X). In the case of optical distance meters, the error arises out of the physics of measuring a travel time of a laser beam traveling at the speed of light. Generally, one of two error components is present depending on the distance between the laser and the reflective target. First, at short range, the optical distance meter will overstate the distance between itself and the reflective target. For example, at zero distance from the reflective target, a particular optical distance meter may read 15 mm. As the distance between the optical distance meter and the reflective target increases, this error tapers off. However, a second error component is present at larger distances. The second error component is sinusoidal in nature, and does not go away as the distance between the optical distance meter and the reflective target is increased. Hence, at larger distances, the output of the optical distance meter will usually be wrong but it will also be within a known range of the correct value.

Figure 6:
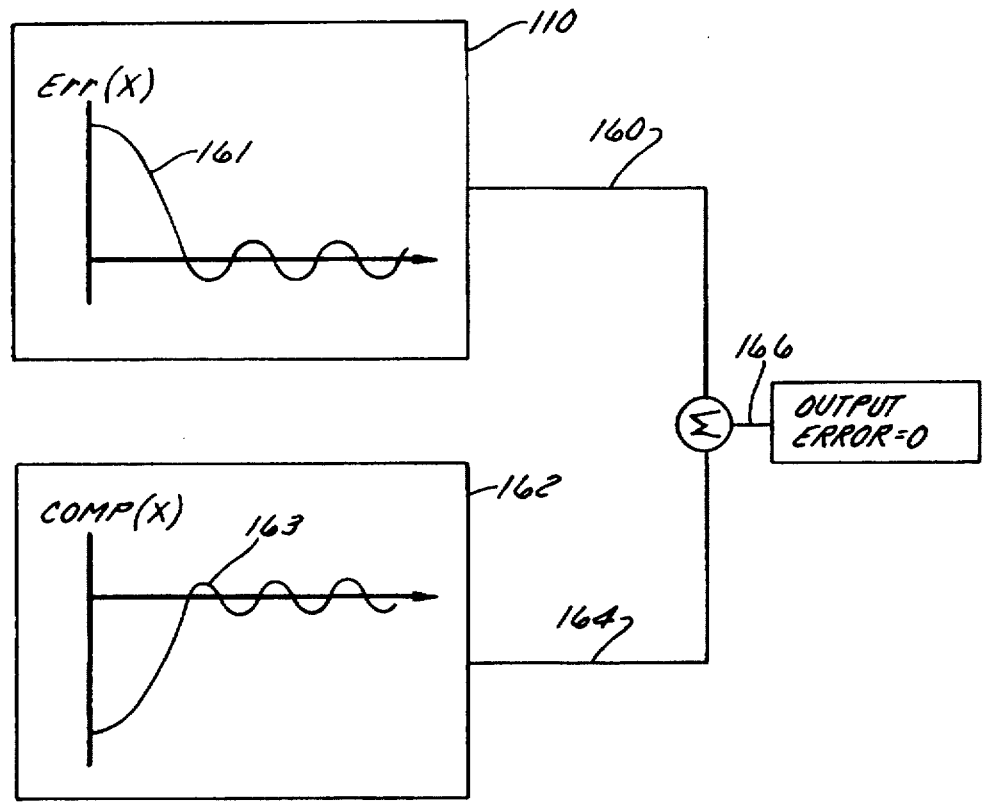
FIG. 6 illustrates the combination of an optical distance meter with a look-up table generated according to the process illustrated in FIG. 5.

Returning now to steps 146, 148, and 150, it is ascertained in step 146 whether $X_{ODM}$ and $X_{ENC}$ are within an acceptable tolerance (TOL%) of each other. Assuming that TOL% represents the potential error of the optical distance meter at larger distances, it is known that the absolute position of the SRM 10 is within TOL% of $X_{ODM}$. Hence, if $X_{ENC}$ is within TOL% of $X_{ODM}$, then it is likely that the encoder 114 is generating correct position information. Therefore, since the encoder 114 is considered to be accurate, the look-up table 162 is updated to reflect $X_{ENC}$. Specifically, a value Comp($X_{ODM}$) is stored at a location uniquely corresponding to $X_{ODM}$, such that $X_{ENC}=X_{ODM}+Comp(X_{ODM})$. As illustrated in FIG. 6, discussed below, this permits the output of the optical distance meter 110 to be as accurate (under any conditions) as that of the encoder 114 (under conditions in which rail slippage is at a minimum).

If $X_{ENC}$ is not within TOL% of $X_{ODM}$, then it is not possible for the encoder 114 to be generating the correct position. In this case, it is necessary to issue a fault in step 148. This allows an operator to make minor adjustments (e.g., enter a new wheel diameter value in the computer 18) and run the procedure again.

Each time the look-up table is updated, it is ascertained in step 152 whether the end of the rail has been reached. If not, the above steps are repeated. If so, the procedure is ended at step 154.

FIG. 6 illustrates the utilization of the look-up table 162 generated by the above procedure. During SRM 10 movement, the optical distance meter 110 produces an output 160. Generally, the output 160 has the error Err(X) represented by graph 161. Graph 161 illustrates the two error components of optical distance meters as described above. As indicated, the error Err(X) varies with the distance X traveled by the SRM 10. Note that only the first few periods of the sinusoidal component are shown. The full range of the optical distance meter 110 extends far to the right of that illustrated, and comprises over one hundred of the sinusoidal cycles illustrated.

Based on the distance $X_{ODM}$ measured by the optical distance meter 110, an index into the look-up table 162 is calculated to select the corresponding compensation value Comp($X_{ODM}$). The value Comp($X_{ODM}$) determined from the look-up table is then added to the output $X_{ODM}$ of the optical distance meter 110. Since Comp($X_{ODM}$)=−Err ($X_{ODM}$), the output 166 is equal to the output $X_{ENC}$ that was given at the same location by the encoder 114 under ideal conditions. Hence, assuming as we did before that the encoder 114 was accurate under the ideal conditions, this process eliminates the error component of the optical distance meter 110.

Instead of storing the difference between the encoder and the optical distance meter, an alternative embodiment would be to store $X_{ENC}$ in the look-up table 162. In this embodiment, the error value stored in the look-up table 162 is simply the value returned by the encoder 114 when the encoder 114 and the optical distance meter 110 made simultaneous distance measurements. Hence, a search based on $X_{ODM}$ would return the corresponding $X_{ENC}$ value directly, without the need for an addition step. Of course, the underlying idea behind the alternative embodiment is the same, but this method would require 4 times the memory since 4 bytes are required to represent $X_{ENC}$, while only 1 byte is required to store Comp($X_{ODM}$) for each look-up table entry.

IV. Creating Redundancy by Updating the Optical Distance Meter

As previously noted, the encoders 104 and 114 have "primary" responsibility for making distance measurements during a middle portion of the SRM trajectory, and the optical distance meters 100 and 110 have "primary" responsibility for distance measurements at the endpoints of the SRM trajectory. It is nevertheless advantageous to use the optical distance meters 100 and 110 to provide redundant distance measurements during the remainder of the SRM trajectory.

However, as previously noted, typical optical distance meters can update position information only ten times per second, or once every 100 msec. This compares to encoders, which can update position information at a rate of about two to five hundred times per second, or once every 5–2 msec. The consequence of this disparity is that the information coming from the encoder is more up to date (typically 5 msec old) than the information coming from the optical distance meter (typically 50–60 msec old). Hence, the two values can not be directly compared, because they represent the position of the SRM 10 at two different points in time.

Figure 7:
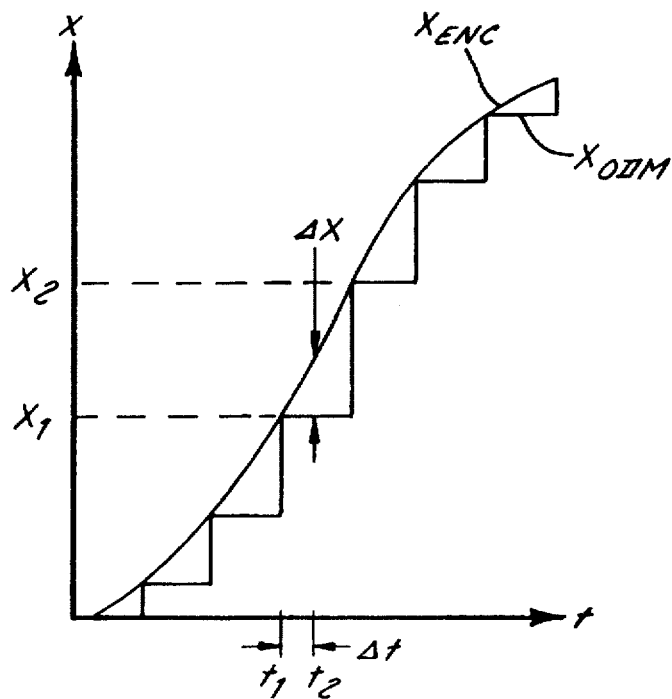
FIG. 7 illustrates a process for comparing an output of an encoder with an output of the optical distance meter according to the present invention.

As illustrated in FIG. 7, the output of the encoder $X_{ENC}(t)$ is updated rapidly and therefore produces a relatively smooth curve. The output of the optical distance meter $X_{ODM}(t)$ is not updated very rapidly, and therefore produces a rough curve. During a given time interval $\Delta t$ from time $t_1$ to time $t_2$, the SRM travels a distance $\Delta X$ from position $X_1$ to position $X_2$. At position $X_2$, a meaningful comparison can not be made because the optical distance meter is still generating the same value that it generated at position $X_1$.

To avoid this problem, it has been found that the output of the encoder $X_{ENC}(t)$ can be used to time shift the output of the optical distance meter $X_{ODM}(t)$ so that a meaningful comparison can be made. Specifically, since it knows time $t_1$, the control system 60 knows how long it has been since the optical distance meter has updated its position reading. Further, the control system 60 can monitor the amount of distance $\Delta X$ that the SRM 10 has traveled during the time interval $\Delta t$ since the optical distance meter was last updated. Hence, the addition of $\Delta X$ to the output of the optical distance meter $X_{ODM}(t)$ produces a value corresponds to the current output of the encoder $X_{ENC}$.

Advantageously, therefore, it is possible to compare the output of the optical distance meter $X_{ODM}(t)$ with the output of the encoder $X_{ENC}(t)$ using the time shifting operation just described. The redundancy thereby permitted improves the overall accuracy and robustness of the vertical and horizontal control systems.

Many changes and modifications could be made to the invention without departing from the spirit thereof. The scope of these changes will become apparent from the appended claims.

We claim:

1. A storage and retrieval machine comprising:

a base, said base being movable in a horizontal direction;

a carriage, said carriage being moveable in a vertical direction;

a control system, said control system controlling movement from a start point to an end point of a trajectory, said movement being movement of one of said base and said carriage, said control system further including a rotary distance meter, said rotary distance meter providing information used by said control system to repetitively determine the current position of said one of said base and said carriage along said trajectory as said one of said base and said carriage traverses said trajectory, an optical distance meter, said optical distance meter providing information used by said control system to determine the absolute position of said one of said base and said carriage near said end point of said trajectory.

2. The storage and retrieval machine according to claim 1, wherein said control system further comprises a look-up table, said look-up table storing error information pertaining to error of said optical distance meter, said error information being generated on the basis of a comparison of distance measurements substantially simultaneously made by said rotary distance meter and said optical distance meter, said error information being stored in said look-up table as a function of the distance of said optical distance meter from a target, and said error information being used by said control system to enhance the accuracy of said optical distance meter and thereby enhance the accuracy with which said one of said base and said carriage is positioned.

3. The storage and retrieval machine according to claim 1, further comprising a servo controller which implements an analog velocity proportional-integral-derivative control system, said servo controller having inputs for said rotary distance meter and said optical distance meter.

4. The storage and retrieval machine according to claim 1, wherein said rotary distance meter is an encoder.

5. The storage and retrieval machine according to claim 1, wherein said optical distance meter also provides information used by said control system to determine the absolute position of said one of said base and said carriage at midpoints of said trajectory.

6. A storage and retrieval machine comprising:

a base, said base being movable in a horizontal direction, a carriage, said carriage being moveable in a vertical direction, a control system, said control system controlling movement of said base in said horizontal direction and movement of said carriage in said vertical direction, said control system further including a first rotary distance meter, a first optical distance meter, said first optical distance meter cooperating with said first rotary distance meter to provide information to said control system, said information pertaining to said movement of said base, a second rotary distance meter, a second optical distance meter, said second optical distance meter cooperating with said second rotary distance meter to provide information to said control system, said information pertaining to said movement of said carriage.

7. A method of controlling movement of a warehouse vehicle from a start point to an end point of a trajectory, said method comprising the steps of:

A. ascertaining the location of said start point;

B. generating information pertaining to said movement of said warehouse vehicle using a rotary distance meter;

C. repetitively determining, based on said generating step (B), the current position of said warehouse vehicle along said trajectory as said warehouse vehicle traverses said trajector;

D. implementing a feedback control system which controls said movement of said warehouse vehicle from said start point to said end point, said feedback control system being implemented based on said movement information generated by said rotary distance meter; and E. generating information pertaining to said movement of said warehouse vehicle using an optical distance meter, said optical distance meter comprising a laser and a laser beam sensor;

F. ascertaining that the moveable object has reached said end point based on said generating step (E), said ascertaining step further comprising the steps of 1. emitting a laser beam from said laser, and
      2. measuring a laser beam travel time, said laser beam travel time being the amount of time required for the laser beam to travel from said laser to said laser beam sensor.

8. The method according to claim 7, wherein said ascertaining step further comprises the step of enhancing the accuracy of said optical distance meter, said enhancing step further comprising the steps of storing error information in a look-up table, said error information pertaining to error of said optical distance meter as a function of the distance of said optical distance meter from a target, retrieving said stored error information from said look-up table, and modifying an output of said optical distance meter based on said stored error information.

9. The method according to claim 8, further comprising the step of generating said error information, said error information generating step comprising the steps of substantially simultaneously generating (1) a rotary distance meter distance measurement and (2) an optical distance meter distance measurement and comparing the measurements (1) and (2) to generate said error information.

10. The method according to claim 7, further comprising the steps of ascertaining a time interval, said time interval starting at an update time of said optical distance meter and ending at a time after said update time, determining a distance traveled by said warehouse vehicle during said time interval, comparing a distance measurement output of said rotary distance meter with a distance measurement output of said optical distance meter, said comparing step taking into account said distance traveled by said warehouse vehicle during said time interval, and updating an output of said optical distance meter based on said comparing step.

11. The method according to claim 7, wherein said warehouse vehicle is a carriage of a storage and retrieval machine.

12. The method according to claim 7, wherein said feedback control system implementing step further comprises the step of implementing an analog velocity proportional-integral-derivative feedback control system.

13. A method of calibrating an optical distance meter with a rotary distance meter, said optical distance meter and said rotary distance meter being adapted for monitoring movement of a warehouse vehicle, said vehicle being one of a base of a storage and retrieval machine and a carriage of said storage and retrieval machine, said method comprising the steps of:

advancing said vehicle along a trajectory;

generating a first distance measurement, said first distance measurement being generated by said rotary distance meter;

generating a second distance measurement, said second distance measurement being generated by said optical distance meter, said first and second distance measurements representing substantially the same location of said vehicle; and storing information pertaining to said second distance measurement in a look-up table as a function of said second distance measurement, said information relating to said first distance measurement.

14. The method according to claim 13, further comprising the steps of ascertaining whether said first distance measurement is within a tolerance of said second distance measurement;

and if said first distance measurement is within a tolerance of said second distance measurement, then repeating said advancing step, said first distance measurement generating step, said second distance measurement generating step, and said storing step until an end of said trajectory is reached;

and if said first distance measurement is not within a tolerance of said second distance measurement, then issuing a fault.

15. The method according to claim 13, further comprising the step of implementing a feedback control system which controls said movement of said vehicle along said trajectory, said feedback control system being implemented based on said movement information generated by said optical distance meter, said implementing step including the steps of retrieving said stored information from said look-up table and modifying an output of said optical distance meter based on said stored information.

16. A storage and retrieval machine comprising:

a base, said base being movable in a horizontal direction;

a carriage, said carriage being moveable in a vertical direction;

a control system; said control system further including a horizontal control system which controls movement of said base along a horizontal trajectory, said horizontal control system including a first rotary distance meter, said first rotary distance meter providing information to said horizontal control system at a middle portion of said horizontal trajectory, a first optical distance meter, said first optical distance meter providing absolute position information to said horizontal control system at an endpoint of said horizontal trajectory, and a vertical control system which controls the movement of said carriage along a vertical trajectory, said vertical control system including a second rotary distance meter, said second rotary distance meter providing relative position information to said vertical control system at a middle portion of said vertical trajectory, and a second optical distance meter, said second optical distance meter providing absolute position information to said vertical control system at an endpoint of said vertical trajectory.

17. The storage and retrieval machine according to claim 16, further comprising a look-up table, said look-up table storing error information pertaining to error of said first optical distance meter.

18. The storage and retrieval machine according to claim 17, wherein said error information is generated on the basis of a comparison of distance measurements substantially simultaneously made by said first rotary distance meter and said first optical distance meter, said error information being stored in said look-up table as a function of the distance of said first optical distance meter from a target, and said error information being used by said horizontal control system to enhance the accuracy of said first optical distance meter and thereby enhance the accuracy with which said base is positioned.

19. The storage and retrieval machine according to claim 16, further comprising a servo controller, said servo controlling having inputs for said first rotary distance meter, said first optical distance meter, said second rotary distance meter, and said second optical distance meter.

20. A method of controlling movement of a warehouse vehicle along a trajectory, said vehicle being one of a base of a storage and retrieval machine and a carriage of said storage and retrieval machine, said method comprising the steps of:

A. determining the position of said vehicle, said determining step including the steps of
 1. generating a first distance measurement with an optical distance meter,
 2. generating a second distance measurement with a rotary distance meter, and
 3. determining said position of said vehicle based on said first and second distance measurements;

B. repeating step (A) such that said position of said vehicle is repetitively determined (1) as said vehicle traverses said trajectory and (2) based on respective repetitively generated first and second distance measurements; and C. implementing a feedback control system which controls said movement of said vehicle along said trajectory, said feedback control system being implemented based on the repetitive determinations of said position of said vehicle determined during step (B).

* * * * *